(12) United States Patent
Kaufman

(10) Patent No.: US 10,149,268 B2
(45) Date of Patent: Dec. 4, 2018

(54) SYSTEM AND METHOD FOR DYNAMIC IDENTIFICATION OF RADIO FREQUENCY TRANSMISSION DEAD ZONES

(71) Applicant: Brian Kaufman, Tucson, AZ (US)

(72) Inventor: Brian Kaufman, Tucson, AZ (US)

(*) Notice: Subject to any disclaimer, the term of this patent is extended or adjusted under 35 U.S.C. 154(b) by 191 days.

(21) Appl. No.: 15/169,029

(22) Filed: May 31, 2016

(65) Prior Publication Data

US 2016/0353412 A1 Dec. 1, 2016

Related U.S. Application Data

(60) Provisional application No. 62/169,079, filed on Jun. 1, 2015.

(51) Int. Cl.
| | |
|---|---|
| *H04W 72/02* | (2009.01) |
| *H04W 64/00* | (2009.01) |
| *H04W 24/08* | (2009.01) |
| *H04W 88/02* | (2009.01) |
| *H04W 16/18* | (2009.01) |

(52) U.S. Cl.
CPC ........... *H04W 64/00* (2013.01); *H04W 24/08* (2013.01); *H04W 16/18* (2013.01); *H04W 88/02* (2013.01)

(58) Field of Classification Search
CPC ..... H04W 64/00; H04W 24/08; H04W 88/02; H04W 16/18
See application file for complete search history.

(56) References Cited

U.S. PATENT DOCUMENTS

| | | | | |
|---|---|---|---|---|
| 8,364,141 | B1* | 1/2013 | Kateley | H04W 24/08 455/423 |
| 2010/0120414 | A1 | 5/2010 | Bellovin | |
| 2011/0151864 | A1 | 6/2011 | Byun et al. | |
| 2012/0139790 | A1* | 6/2012 | Wirola | G01S 5/0252 342/385 |
| 2013/0090090 | A1 | 4/2013 | Rivere | |
| 2015/0119068 | A1* | 4/2015 | Kudekar | H04W 4/043 455/456.1 |
| 2015/0289111 | A1* | 10/2015 | Ozkan | H04W 4/04 455/456.1 |
| 2015/0289145 | A1* | 10/2015 | Sun | H04W 24/04 455/446 |
| 2016/0174183 | A1* | 6/2016 | Sun | H04W 4/023 455/456.2 |

* cited by examiner

*Primary Examiner* — Hassan Kizou
*Assistant Examiner* — Hector Reyes
(74) *Attorney, Agent, or Firm* — Studebaker & Brackett PC

(57) ABSTRACT

A system and method are described that include pre-processing of user data at a mobile communication device prior to transmission of the user data to a cellular-connected server. Such pre-processing increases the efficiency of the cellular-connected server to permit near real time mapping of dead zones while maintaining a high degree of accuracy of the dead zone boundary.

19 Claims, 6 Drawing Sheets

SYSTEM AND METHOD FOR DYNAMIC IDENTIFICATION OF RADIO FREQUENCY TRANSMISSION DEAD ZONES

CROSS-REFERENCE TO RELATED APPLICATIONS

This application claims the benefit of priority to U.S. Provisional Patent Application No. 62/169,079, filed on Jun. 1, 2015, which is hereby incorporated by reference in its entirety.

TECHNICAL FIELD

This disclosure relates to nearly continuous dynamic identification of radio frequency transmission dead zones.

BACKGROUND

Mobile communications devices are conventionally known. One challenge with mobile communication devices is identifying areas where radio frequency transmission is insufficient for communication, which is typically described as a dead zone.

SUMMARY

This disclosure provides a system for mapping a radio frequency signal dead zone of a cellular system, the system comprising at least one cellular system antenna, a mobile communication device, and a first cellular system processor. The at least one cellular system antenna is configured to transmit and to receive radio frequency signals. The mobile communication device includes at least one of a geographic location system receiver and a geographic location system device, a mobile communication device antenna, a mobile communication device processor, and a non-transitory memory. The mobile communication device antenna is configured to transmit and receive signals from the at least one cellular system antenna. The mobile communication device being configured to determine by way of signals received by the mobile communication device antenna that the mobile communication device has entered the radio frequency dead zone, and being configured to store in the non-transitory memory location data received by the mobile communication device from the geographic location system receiver or location data determined by the geographic location system device. When the mobile communication device is determined to leave the dead zone, the mobile communication device processor is configured to pre-process the stored location data to generate a convex hull and to transmit signals representing vertices of the convex hull to the at least one cellular system antenna. The first cellular system processor is communicatively connected to the at least one cellular system antenna, and is configured to receive the pre-processed location data transmitted by the mobile communication device and to create a concave hull map from the pre-processed data. The created concave hull map is transmitted by way of the at least one cellular system antenna to the mobile communication device for contemporaneous presentation on a display of the mobile communication device.

This disclosure also provides a method for mapping a radio frequency signal dead zone of a cellular system. The method comprises determining that a mobile communication device has entered a dead zone; receiving geographic location data of the mobile communication device from a geographic location data system or determining geographic location data of the mobile communication device with a geographic location data device internal to the mobile communication device while the mobile communication device is in the dead zone; determining that the mobile communication device has left the dead zone; pre-processing the geographic location data in the mobile communication device to generate a convex hull boundary having a plurality of vertices after determining that the mobile communication device has left the dead zone; transmitting the plurality of vertices of the convex hull boundary to a processor of the cellular system; aggregating at the processor the received plurality of vertices with other received pluralities of vertices and processing the aggregated vertices to create a concave hull map of the radio frequency dead zone; and transmitting the created concave hull map to the mobile communication device for contemporaneous presentation on a display of the mobile communication device.

This disclosure also provides a system for mapping a dead zone of a cellular system for presentation on a mobile communication device, the system comprising at least one cellular system antenna and a cellular system processor. The at least one cellular system antenna is configured to transmit and to receive radio frequency signals. The mobile communication device includes at least one of a geographic location device configured to determine location data and a geographic location system receiver configured to receive location data; a mobile communication device antenna configured to transmit signals to and receive signals from the at least one cellular system antenna; a mobile communication device processor; and a non-transitory memory. The mobile communication device being configured to determine from the received signals whether the mobile communication device has entered the dead zone, and being configured to store in the non-transitory memory location data received by the mobile communication device. When the mobile communication device is determined to leave the dead zone, the mobile communication device processor is configured to pre-process the stored location data to generate a convex hull and to transmit vertices of the convex hull to the at least one cellular system antenna. The cellular system processor is configured to receive the vertices from the at least one cellular system antenna and to create a concave hull map using the vertices, and the created concave hull map is transmitted to at least one user.

Advantages and features of the embodiments of this disclosure will become more apparent from the following detailed description of exemplary embodiments when viewed in conjunction with the accompanying drawings.

DETAILED DESCRIPTION

Figure 1:
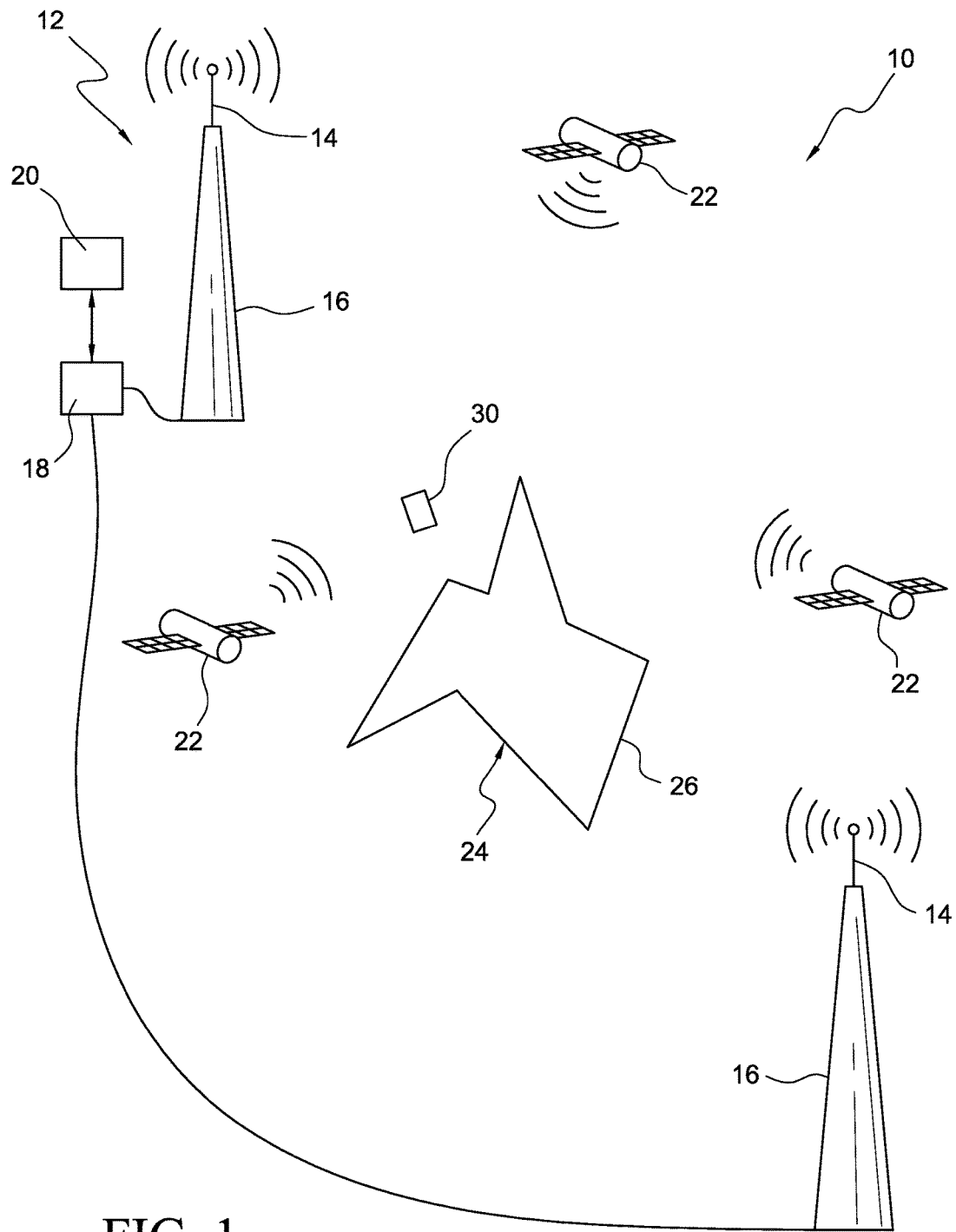
FIG. 1 shows a view of a system and a dead zone in accordance with an exemplary embodiment of the present disclosure.

Offline tracking by mobile communication devices has not been widely adopted by users partially because storage space is at a premium on most mobile devices and it is not feasible to store maps and metadata of every possible location at which a mobile communication device might be disconnected from a cellular network. Currently, no system and method exists that can efficiently and accurately map dead zones from user data in real time. Such a system and method could provide a significant advantage to users of mobile communication devices by detecting proximity to a dead zone and then downloading smaller, more detailed maps after predicting entry into the dead zone and downloading metadata to use while in transit through the dead zone. The detailed map could enable the user of a mobile communication device to know what the dead zone looks like and which direction to travel to restore connection to the cellular network.

An algorithm called an alpha-shape algorithm exists that includes the capability of constructing dead zone boundaries based on user-supplied data. However, the alpha-shape algorithm does not operate efficiently enough on a large data set to be employed by a server to map dead zones in real time. The present disclosure provides a system and method that includes pre-processing of user data at a mobile communication device prior to transmission of the user data to a cellular-connected server, thus increasing the efficiency of the cellular-connected server to permit near real time mapping of a dead zone while maintaining a high degree of accuracy with respect to the boundary of the dead zone. This information is then fed back to the mobile communication device for almost instantaneous access by the mobile communication device and/or the end user of the mobile communication device.

Offline tracking systems and methods have grown significantly more accurate in recent years, yet still have not been widely adopted by users for a variety of reasons. Among the reasons is the difficulty of knowing with any degree of accuracy and precision the location of dead zones. Dead zones can change for a variety of reasons, including humidity, wind, foliation, atmospheric disturbances, electromagnetic interference, reflections of radio waves, etc. Such changes can move the boundaries of a dead zone by tens or even hundreds of feet in the course of a day. Current systems for identifying dead zones require input of a vast amount of data, and then lengthy processing of the data that requires many hours and even days to complete. By the time processing is completed, the boundary of the dead zone can be significantly different from the boundary determined from data collected hours or days earlier. Since dead zone identification is not timely, it is perceived to be unreliable and is, accordingly, not widely used.

Another reason for the failure to widely adopt offline tracking is that a map of the relevant area may not be on the mobile communication device when it enters a dead zone, at which point it is not possible to load maps of the dead zone and/or areas near the dead zone. In addition, it is typically not possible to preload detailed maps of all potential areas a user might enter because storage space is at a premium on most mobile devices. If a system and method existed to rapidly and accurately map dead zones, it would open the door for applications that could automatically detect when a mobile communication device approached a dead zone, and download more detailed map data and metadata to use prior to reaching the dead zone for use within the dead zone. Even beyond this capability, accurately mapping dead zones would afford users much more information about the boundaries of the dead zone and would enable users to know the best direction to move to restore cellular network connection. Such a system could be entirely enabled and supported by pre-processed data from the mobile communication devices of users, making the users part of the system. Such a system would provide value to those users as well as to cellular network providers by allowing the network providers to gather contemporaneous data about the shape and location of dead zones. For the proposed system to work, the system needs to be configured to quickly and accurately parse user data and to map the shapes and locations of the dead zones.

Historically, alpha-shapes have been widely used when trying to map a boundary from a set of data. Alpha-shapes are polygons that are constructed from a set of location data points and correspond to a boundary of those location data points. For any set of location data points there is only one way to draw a convex polygon that is a boundary of those location data points. The boundary of location data points is called a convex hull and although it can be used to map a boundary, it is not capable of creating a map that has concave sections.

Unlike a convex hull, there are multiple ways to draw or map a concave polygon that is a boundary of a set of points. Because of the numerous approaches to mapping a concave polygon, it is impossible to create an algorithm to draw a single perfect concave hull of a set of points. Instead, different concave hull configurations must be evaluated based on some predetermined heuristic. The alpha-complex of a set of points is a triangulation of points based on such a heuristic. The alpha-complex evaluates all the triangles in a Delaunay Triangulation of the points by the radius of their smallest enclosing circles and removes triangles with a radius larger then $1/\alpha$. In other words, the alpha-complex removes the longer, thinner triangles, leaving triangles which have sides that are all similar lengths, creating a new triangulation that only connects points that are closer together. This removal process makes the triangulation more likely to correspond to a boundary that tightly encloses the set of location data points. The boundary of an alpha-complex constructed this way is called an alpha-shape and it corresponds to a concave hull of the set of points that is more likely to reflect an actual boundary, which in the case of the present disclosure is a concave hull map.

Constructing an alpha-shape is a candidate for a system to map the boundary of a dead zone. However, because it takes $O(n \log n)$ time to construct an alpha-shape, alpha-shapes are usually used to process a large amount of location data points only once, or are used to process slow moving data. The mathematical expression $O(n \log n)$ is a type of mathematical expression described as big O notation. Big O notation is used in computer science to classify processes by how they respond to changes in input size, particularly a growth rate in processing time when encountering increasing quantities of data. Constructing alpha-shapes to map the boundaries of dead zones is much too slow when rapidly receiving data from users that can include hundreds to thousands of location data points from each user. To efficiently and rapidly map the boundary of a dead zone, on the order of a second, it becomes necessary to use a different algorithm or to find a way to keep the number of inputs relatively small to minimize the run time to construct alpha-shapes.

To describe an exemplary embodiment of the present disclosure, it is necessary to first explain the context in which the embodiment would be used. The system algorithms would run on a server that takes input from users through an application or process that would run on a mobile communication device such as a smart phone. This application or process would periodically ping or ask the server for information about the location of geographically near dead zones, and would store that information in non-transitory memory of the mobile communication device.

The definition of near in this context can be adaptive based on travel conditions. For example, when a mobile communication device is travelling at a high rate of speed, such as 60 to 80 miles per hour, the definition of near can be, for example, up to five miles away, or a predetermined distance in a range from one to five miles, which provides time to download a dead zone map and metadata of relevance in the dead zone. As another example, when the mobile communication device is travelling at a low rate of speed, such as speeds up to 10 miles per hour, the definition of near can be, for example, 3,300 feet, or a predetermined distance in a range from about 800 feet up to 3,300 feet.

When the mobile communication device, based on data received from a server connected to the cellular network, detects that it is close to a dead zone, the mobile communication device would again contact the server to download a map of the dead zone and the surrounding area. If the mobile communication device gets disconnected, it would activate offline tracking, for example, by using a GPS receiver, a pedestrian dead reckoning system, a motion tracking system, or another offline tracking system, and then periodically record its location and log those points as inside the dead zone. Some offline tracking systems rely upon hardware within the mobile communication device, such as an accelerometer, magnetometer, etc., that provide estimations of distance travelled and direction of travel. Data logging would continue until the mobile communication device is reconnected or non-transitory memory available for data logging is filled. After the mobile communication device is reconnected to the cellular network, the process transmits location data to the cellular network connected server. By ensuring that the process only transmits location data after the user is disconnected and then reconnected to the cellular network, the system and method ensures that every user's location data includes at least two points that will be close to the boundary of the dead zone, as the location at which the mobile communication device lost cellular network connection and the location at which the mobile communication device regained network connection should lie close to the boundary location of the actual, physical dead zone. Because at least some of the collected location data points obtained by pre-processing remain as part of the set of location data points, the accuracy of a dead zone map is extremely high, as discussed in more detail hereinbelow.

Location data needs to be acquired within the dead zone for development of high-quality dead zone maps, described in more detail hereinbelow. A limited number of location data can also be acquired just outside a dead zone boundary to further refine boundary positions more precisely. More specifically, since mobile communication device 30 is continuously collecting location data, once a dead zone entry is identified, a limited number, for example, 2-4 location data points, just outside the dead zone can be identified and stored in non-transitory memory as being outside the dead zone. Similarly, when exit from the dead zone is identified, a limited number of location data points just or immediately outside the dead zone boundary can be stored in non-transitory memory. The location data points on either side of the dead zone can be used in a closest pair process to identify boundary points of the dead zone, as opposed to hull vertices internal to the dead zone, during pre-processing as a part of pre-processing.

Many aspects of the disclosure are described in terms of sequences of actions to be performed by elements of a computer system or other hardware capable of executing programmed instructions, for example, a general-purpose computer, special purpose computer, workstation, or other programmable data process apparatus. It will be recognized that in each of the embodiments, the various actions could be performed by specialized circuits (e.g., discrete logic gates interconnected to perform a specialized function), by program instructions (software), such as program modules, being executed by one or more processors (e.g., one or more microprocessors, a central processing unit (CPU), and/or application specific integrated circuit), or by a combination of both. For example, embodiments can be implemented in hardware, software, firmware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information. It should be noted that the system of the present disclosure is illustrated and discussed herein as having various modules and units that perform particular functions.

It should be understood that these modules and units are merely described based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including, but not limited to, keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Turning now to FIGS. 1-6, a system, indicated generally at 10 in FIG. 1, and method in accordance with an exemplary embodiment of the present disclosure is described. System 10 includes a cellular network 12, and cellular network 12 includes a plurality of cellular antennas 14 supported by an antenna support 16, which can be, for example, a cellular tower. Cellular network 12 also includes, or communicates with, at least a first server or processor 18. As will be seen, first server or processor 18 can be connected to and communicate with a second server or processor 20. System 10 further includes one or more mobile communication devices 30, each of which communicates wirelessly through radio waves to cellular antenna(s) 14, and, accordingly, to first server 18. Mobile communication device 30 can also communicate with an external geographic location system or mobile communication device 30 can include an internal geographic location device or system. The external geographic location system can be a system such as a plurality of GPS satellites 22. Other geographic location systems can include the Russian GLONASS system, the Indian IRNSS/NAVIC system, the Chinese BeiDou-2tf system, the European Union Galileo positioning system, the Japanese QZSS system, and other systems that are capable of providing mobile communication device position or location data. Note that some of the aforementioned systems are in the development and/or deployment stage and as of the filing of this disclosure and some of these systems are not yet operational or are not yet fully operational. The internal geographic location device or system can include accelerometers and a magnetometer that provide signals to, for example, a pedestrian dead reckoning system, a motion tracking system, or other system internal to mobile communication device 30 for providing approximate location data for mobile communication device 30 as device 30 moves through a dead zone. Mobile communication device 30 can be, for example, a smart cellular-enabled phone, a tablet, a laptop, or other electronic device that includes at least the ability to communicate with cellular network 12 and GPS satellites 22.

Figure 2:
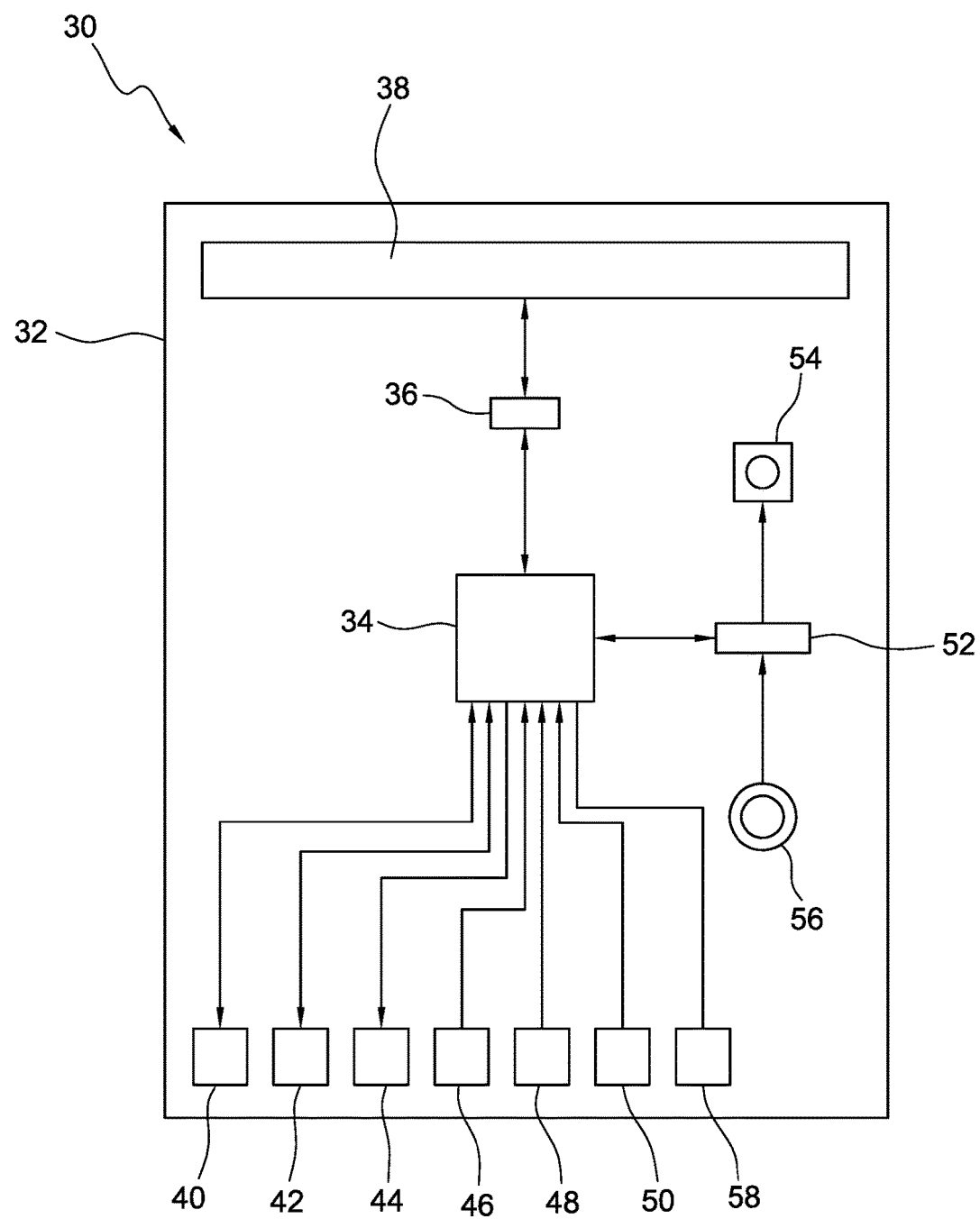
FIG. 2 shows a block diagram of a mobile communication device of the system of FIG. 1.

FIG. 2 shows a block diagram of the elements or subsystems of mobile communication device 30, which in the exemplary example of FIG. 2 is a cellular enabled smart phone. Mobile communication device 10 includes a housing or casing 32 which supports and positions a processor 34. Device 10 further includes a radio frequency (RF) transceiver 36 and an antenna 38. Processor 34 communicates with cellular network 12 by way of RF transceiver 36 and antenna 38. Mobile communication device 10 can further include a sim card 40, non-transitory memory 42, a display 44, touch and/or pressure sensors 46, an accelerometer 48, a GPS receiver 50, an A/D-D/A converter 52, a speaker 54, a microphone 56, and a magnetometer 58. Processor 34 is connected, directly or indirectly, to each of these devices, and transmits signals to these devices, which can include control signals, receives signals from these devices, or transmits and receives signals from these devices.

Mobile communication 10 can include non-transitory memory in more than one location. In addition to non-transitory memory 42, sim card 40 can include non-transitory memory as can processor 34.

Processor 34 is also configured to transmit signals to speaker 16 and to receive signals from microphone 56 by way of A/D-D/A converter 40. Non-transitory memory 42 can store processes for mobile communication device 30 that can be transferred or communicated to processor 34 for operation. Transceiver 36 can include a plurality of transceivers for communication by way of, for example, Wi-Fi, cellular network 12, and radio frequency identification (RFID). Transceiver 36 transmits signals to and receives signals from antenna 38, which can include a plurality of electrodes for transmitting and receiving signals in a plurality of frequency ranges.

Figure 3:
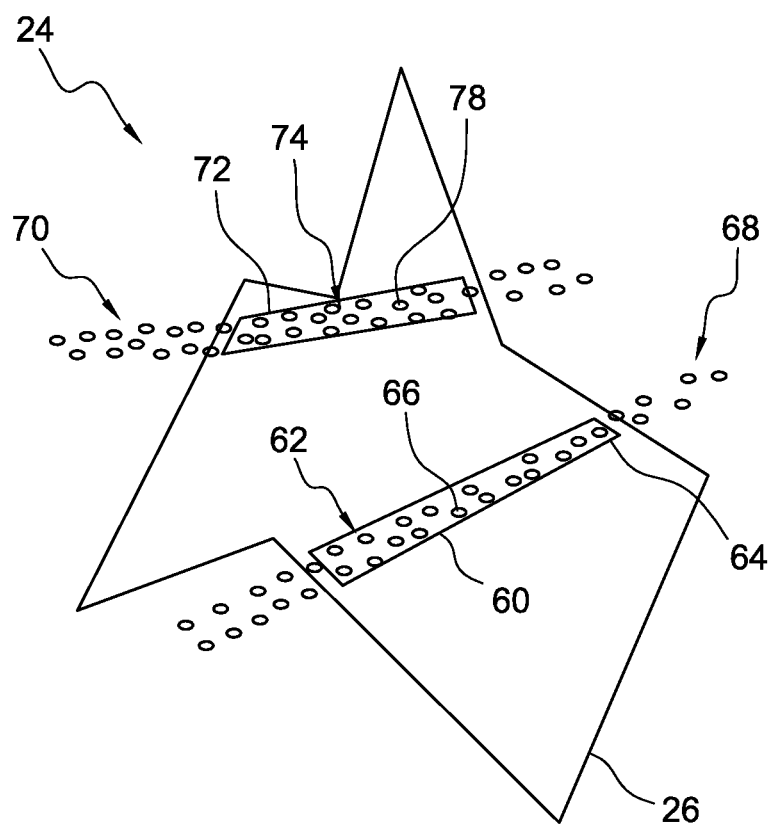
FIG. 3 shows an enlarged view of the dead zone of FIG. 1 with stylized location data points collected in the dead zone.

Also shown in FIGS. 1 and 3 is a stylized dead zone 24. In the context of this disclosure, a dead zone refers to a region where radio wave signals that would otherwise be available from, for example, cellular network 12, are of insufficient strength for reliable or any communication with cellular network 12.

Figure 4:
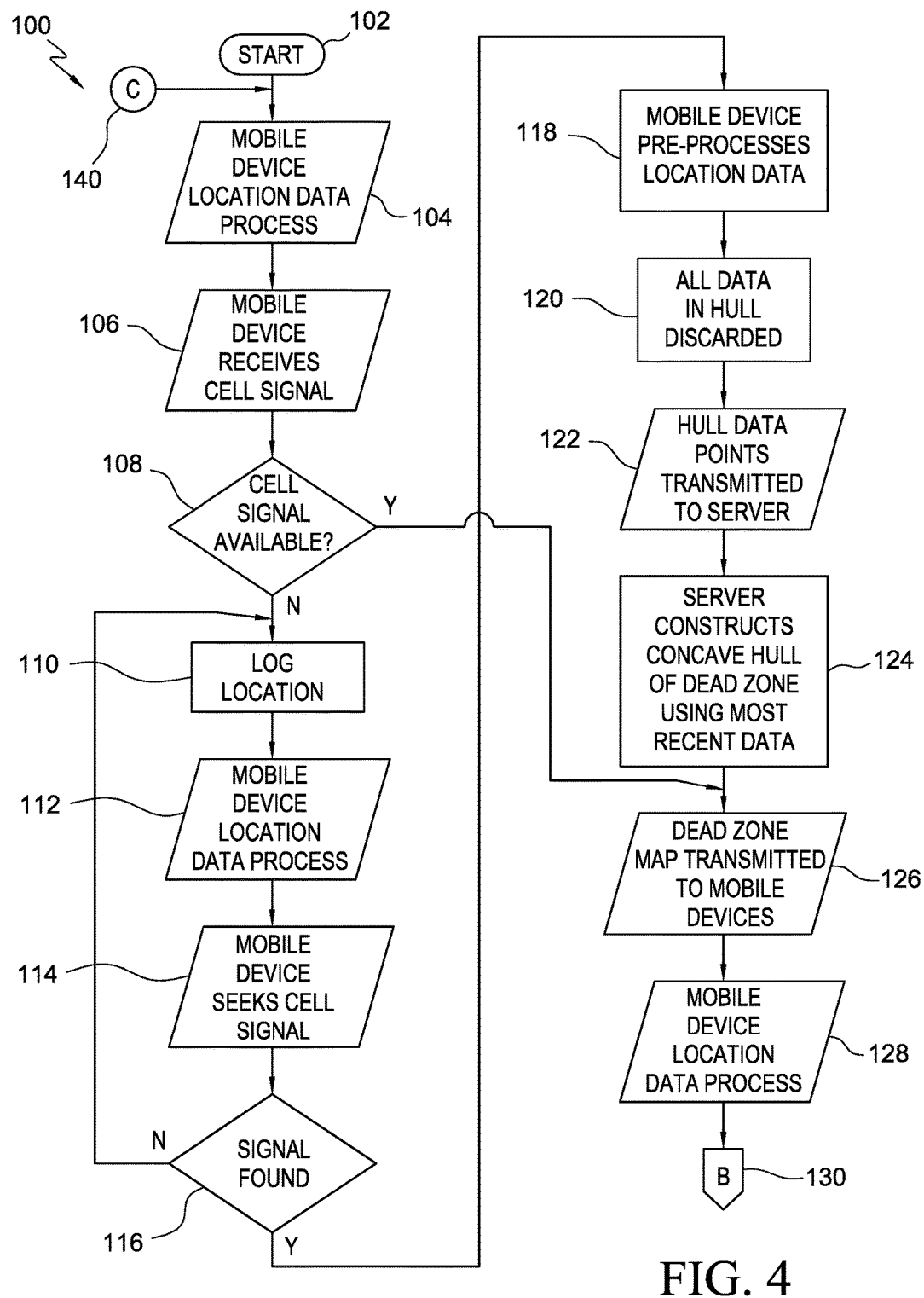
FIG. 4 shows a view of a first page of a process flow of the system of FIG. 1 in accordance with an exemplary embodiment of the present disclosure.
Figure 5:
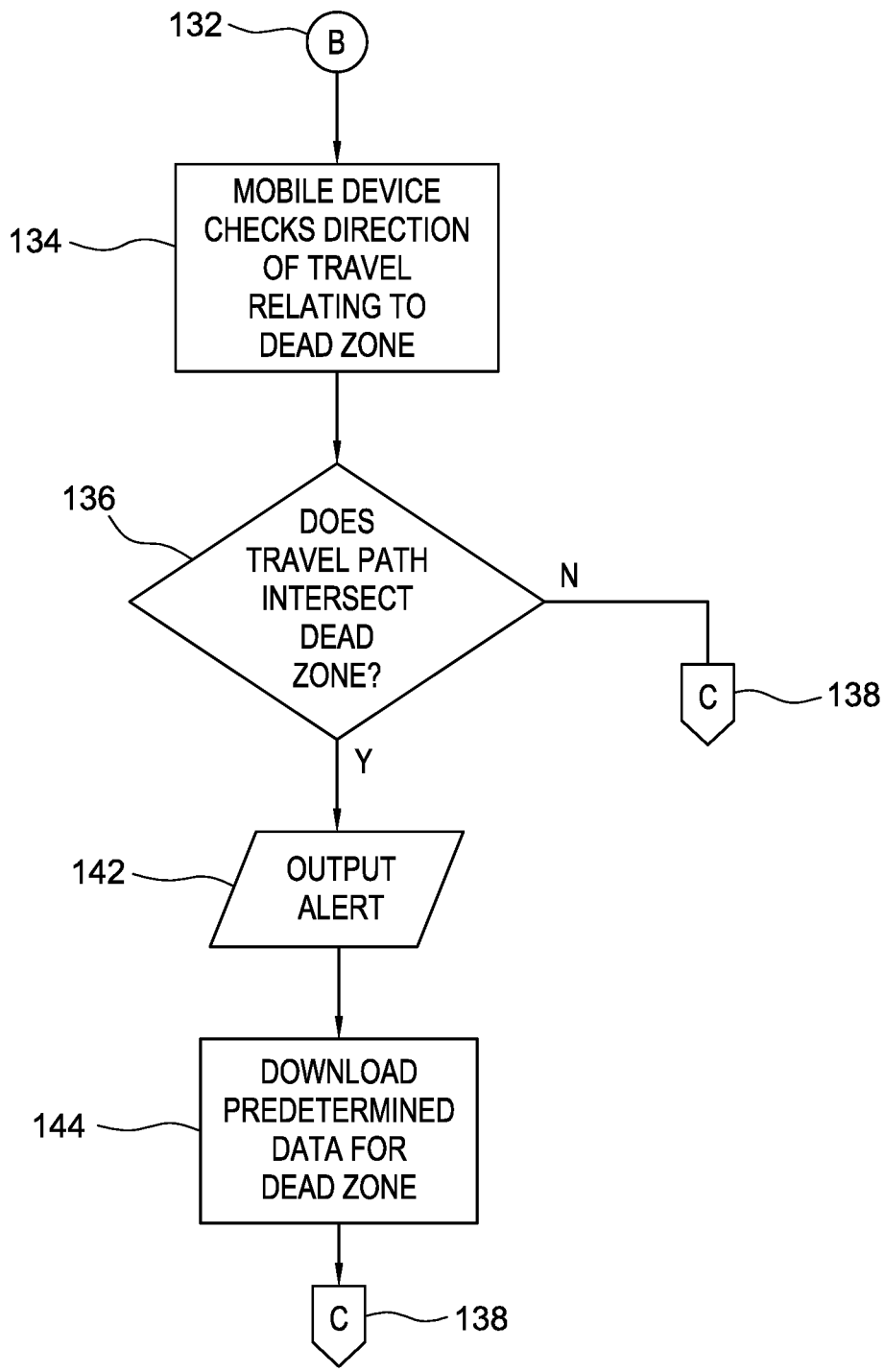
FIG. 5 shows a view of a second page of a process flow of the system of FIG. 1 in accordance with an exemplary embodiment of the present disclosure.
Figure 6:
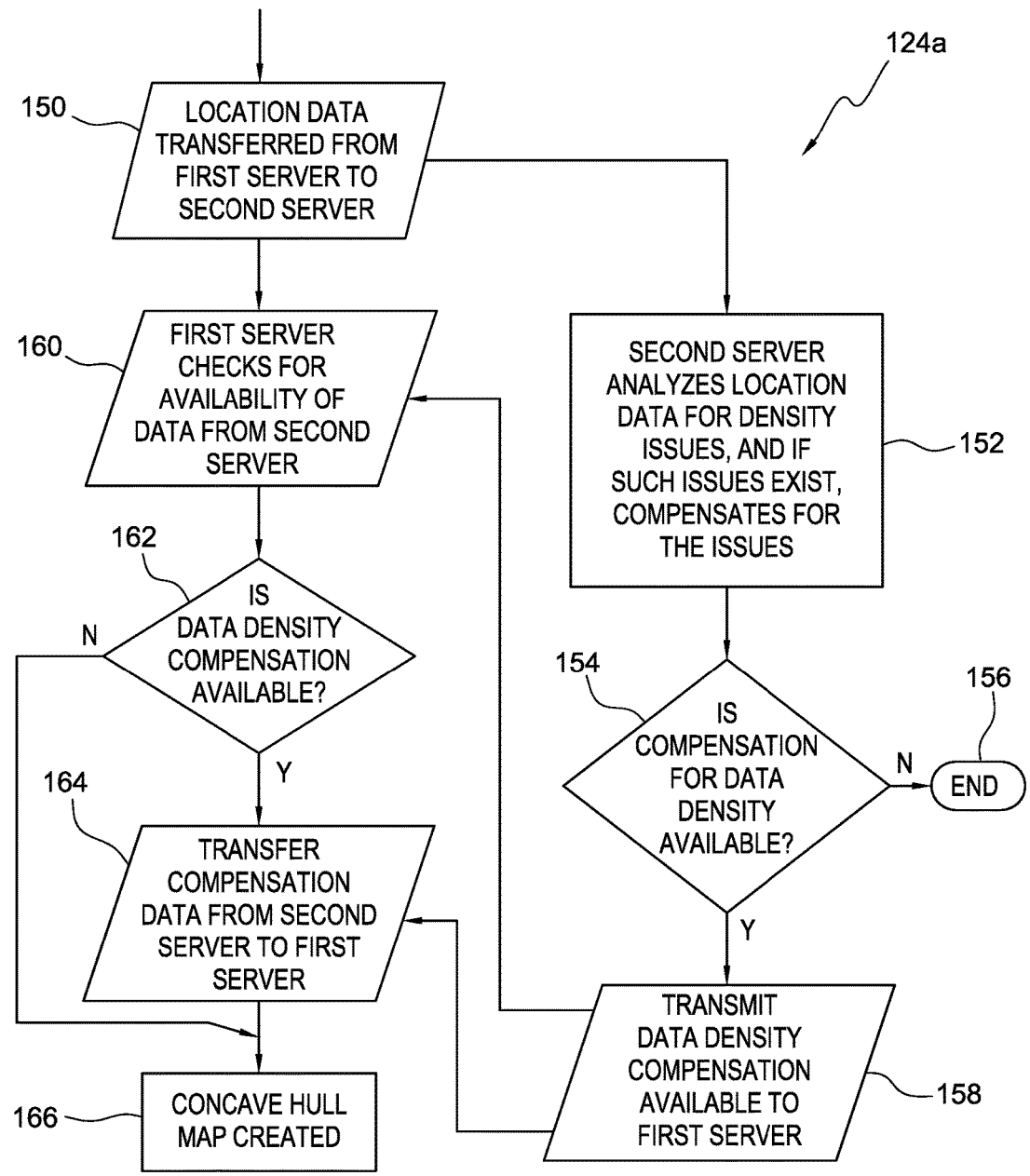
FIG. 6 shows a view of an optional process flow of the system of FIG. 1 in accordance with an exemplary embodiment of the present disclosure.

Referring now to FIGS. 4-6, a dynamic dead zone identification process, indicated generally at 100, in accordance with an exemplary embodiment of the present disclosure is shown. As described elsewhere in this disclosure, current dead zone identification processes are time consuming and the results of such processes are delayed for hours or even days after data is provided to the processes. In contrast, process 100 analyzes location data, which is pre-processed by processor 34 of mobile communication device 30 and then transmitted to first processor 18, in seconds, providing rapid and, relative to current processes, contemporaneous data on the boundaries of dead zones. The ability to determine a dead zone boundary from location data and transmit that analyzed data to a plurality of mobile communication device users within seconds of receiving such data is dynamic as compared to conventional processing.

At a start process 102, various portions of system 10 are initialized, and the processes necessary for the functions of system 10 are transferred, for example, from non-transitory memory 42 to processor 34. Once system 10 is initialized, control passes from start process 102 to a location data process 104.

Process 100 includes a plurality of location data processes, including location data process 104. Each location data process, including process 104, operates in a similar or the same way. During location data process 104, as with the other location data processes of process 100, location data is either generated internally to mobile communication device 30, or GPS receiver 50 receives signals from a plurality of GPS or other geographic location system satellites 22 to identify the present location of mobile communication device 30. For the sake of brevity, other location data processes will refer to location data process 104 for description of functionality. Once location data has been internally generated or externally received from satellites 22, control passes from location data process 104 to an RF signal process 106.

At RF signal process 106, mobile communication device 30 seeks an RF signal and determines whether the signal from one or more cellular antennas 14 is adequate for RF communication. Control then passes from RF signal process 106 to an RF signal decision process 108.

At RF signal decision process 108, if the RF signal is inadequate for communication with cellular network 12, control passes from RF signal decision process 108 to a log location process 110, where the location data generated or received at location data process 104 is saved in, for example, non-transitory memory 42 as a dead zone location. Control then passes from log location process 110 to a location data process 112, which functions similar to location data process 104, described hereinabove. Control then passes from location data process 112 to an RF signal process 114.

At RF signal process 114, which functions in a manner similar to RF signal process 106, mobile communication device 30 again seeks an RF signal and determines whether the signal is adequate for RF communication is available from one or more cellular antennas 14. Control then passes from RF signal process 114 to an RF signal decision process 116.

At RF signal decision process 116, if an RF signal was not located during process 114, control passes from process 116 to log location process 110, which functions as described hereinabove. It should be noted that on return to log location process 110, the logged location is GPS location data generated or received at location data process 112, and the location data is saved in, for example, non-transitory memory 42 as a dead zone location. If an RF signal was located during RF signal process 114, control passes from RF signal decision process 116 to a pre-processing process 118.

At pre-processing process 118, all GPS location data in the dead zone is pre-processed. In an exemplary embodiment, the pre-processing takes place in, for example, processor 34 of mobile communication device 30 to reduce the workload on first processor 18. However, the location data could be downloaded to first processor or server 18 for transfer to second processor or server 20, where pre-processing can also take place.

Referring to FIG. 3, the first step in pre-processing process 118 is to identify or define a convex hull or boundary 60 around all points 62 that were logged as being inside dead zone 24. It should be noted that convex hull 60 includes a plurality of vertices 64 defined by the outermost location data points 62. The number of location data points prior to pre-processing by processor 34 of mobile communication device 30 can be a few hundred points to thousands of points. After pre-processing, the number of location data points is likely to be in the range of 4 to 10, with 10 location data points being a preferred maximum number of location data points. As discussed hereinabove, pre-processing can include location data points just outside boundary 26 of dead zone 24, and a closest pairs process can be used during pre-processing to determine the location of the dead zone boundary for that particular set of data. Once pre-processing is completed, control passes from process 118 to a discard process 120.

At discard process 120, all location data points 66 internal or interior to boundary or convex hull 60 are discarded. Though FIG. 3 shows a relatively small number of location data points 62, it should be understood that one mobile communication device 30 can store hundreds to thousands of location data points. Accordingly, discard process 120 eliminates all but the location data points that define boundary or convex hull 60, which substantially simplifies and speeds later processing. Control then passes from discard process 120 to a data transmission process 122.

At data transmission process 122, the location data points that define convex hull or boundary 60 are transmitted via antenna 38 to first processor or server 18 of cellular network 12. Control then passes from data transmission process 122 to a concave hull process 124.

At concave hull process 124, the vertices of this convex hull received from mobile communication device 30 are added to previously recorded location data points. To limit the amount of data processed, only the most recent location data points from all mobile communication devices, which in an exemplary embodiment are in the range of 1,000 to 3,000 data points, are aggregated and retained for processing, and previous location data points are discarded. An alpha-shape representing the best guess at a boundary 26 of dead zone 24 is then calculated using this new aggregate.

By pre-processing data at pre-processing process 122 on mobile communication device 30 and then creating boundary 26 at concave hull process 124 on a server or processor connected to the cellular network, which boundary 26 is a concave hull map, the relative error is estimated to be approximately 10±4% as compared to a relative error of 6±5% using a conventional alpha-shape process using all location data points, which is considered acceptable for determination of dead zones for mobile communication device 30. The speed of processing to construct an alpha-shape, after pre-processing 300 paths, each initially having 1,000 location data points, down to approximately 10 location data points, is approximately one second, which is a tremendous improvement in speed over a conventional alpha-shape process that requires an exponential growth in speed of processing as the number of location data points increase. Thus, system 10 and process 100 are able to provide an acceptable relative error with a processing speed that enables a dynamic map of a dead zone, which, considering the minimal time needed for processing of the location data, is very near to real time. Because the concave hull map is contemporary, near real time, the map can be transmitted to the user of mobile communication device 30 and be useful to the user of device 30 to predict when the user will enter a mapped dead zone. Therefore, the user can determine whether to avoid the dead zone, or can obtain maps or data regarding locations within the dead zone prior to entry into the dead zone. Such maps or locations can include information about, for example, restaurants, service or gas stations, towns, retail establishments, etc.

Once processing to develop a concave hull alpha-shape is complete, control passes from concave hull process 124 to a map transmission process 126, where a map of the dead zone is transmitted to mobile communication devices 30 that are relatively near to the dead zone. Near in the context of this disclosure is described elsewhere herein. Once map transmission process 126 is complete, control passes to location data process 128, which functions in a manner comparable to location data processes 104 and 112, described hereinabove. Control then passes from location data process 128 through an off-page connector 130 to an on-page connector 132 in FIG. 5 and then to travel direction process 134.

At travel direction process 134, mobile communication device 30 determines whether a travel path, such as a travel path 68 shown in FIG. 3, will intersect a dead zone, such as dead zone 24. All dead zone data can be stored in, for example, first server or processor 18 or second server or processor 20. As mobile communication device 30 moves, several options exist for downloading dead zone data. In an exemplary embodiment, only dead zones within a predetermined distance, for example, within 10 miles, are downloaded to mobile communication device 30. In another exemplary embodiment, only the closest dead zone is downloaded. In yet another exemplary embodiment, a predetermined number of the closest dead zones, for example, 10, are downloaded. In an exemplary embodiment, travel direction process 134 can determine that a travel path will be within a predetermined distance of a dead zone. Such information can be useful when a travel path includes, for example, turns that change a travel path from being in proximity or being approximately tangential to directly intersecting a dead zone within a short distance. Once travel direction process 134 determines the relationship of a travel path to one or more dead zones, control then passes from travel direction process 134 to an intersection decision process 136.

It should be observed that FIG. 3 also shows another travel path 70, which includes a convex hull or boundary 72 that bounds a plurality of location data points 74. Boundary 72 includes a plurality of vertices 64 that are the only data transmitted to cellular system 12 after internal location points 78 are discarded.

At intersection decision process 136, if, for example, travel path 68 at a location outside dead zone 24 does not intersect dead zone 24, control passes through an off-page connector 138 through an on-page connector 140 in FIG. 4 to location data process 104, which functions as described elsewhere in this disclosure. If travel path 68 does intersect dead zone 24, as shown in FIG. 3, control passes from intersection decision process 136 to an alert process 142.

At alert process 142, the user of mobile communication device 30 can be alerted, such as by way of speaker 54, display 20, or by other features of mobile communication device 30, that the user is approaching a dead zone. The user then has several options available. The user can review the dead zone map received at map transmission process 126 and change direction. The user can download predetermined data at a download process 144, which can be done automatically either with or without alert process 142. The predetermined data can include map metadata regarding locations within dead zone 24, and which can be located by using location data acquired in one of the location data processes. The predetermined data can be the latest available dead zone map. The user may elect to suspend an active call prior to entering the dead zone. The user may also use the dead zone map to determine approximately when the dead zone is exited or a fastest path through the dead zone. Once alert process 142 and download process 144, if used, are complete, control passes through off-page connector 138 to on-page connector 140 to location data process 104, which functions as described elsewhere in this disclosure.

Because process 124 discards the oldest location data, there is a risk that a dead zone contains both high travel areas and relatively low travel areas may be unable to maintain adequate definition of a dead zone. One option for accommodating a dead zone with high travel and very low travel density areas is shown as an alternative embodiment concave hull process 124a in FIG. 6.

Concave hull process 124a begins by transferring preprocessed location data sets from first server 18 to second server 20 at a data transfer process 150. Control then passes from data transfer process 150 to a location data analysis process 152, which is performed at second server 20. While second server 20 performs processes 152, 154, and 158, separate from first server 18, control at first server 18 passes from data transfer process 150 to a check data availability process 160, described in more detail hereinbelow.

At location data analysis process 152, second server 20 analyzes all available location data to determine whether a data density issue exists. For example, second server 20 can calculate the location data density of, for example, different portions of dead zone 24, and determine whether areas of very low data density exist. It should be noted that there are many options for determining location data density. For example, density can be randomly sampled. In another example, a density map can be constructed and high and low values can be compared to provide a guide in determining dead zones that may require additional processing. Yet another way of monitoring data density is indirect. If dead zone boundaries fluctuate significantly with time, for example by an amount greater than 10% or 20%, first processor or server 18 or second processor or server 20 may flag the dead zone as potentially having significant variability in location data, and perform additional analysis to accommodate such variability.

If an area of dead zone 24 is identified that has such low location data density that those location data points may be discarded, second server 20 can compensate for the location data that is potentially to be discarded to avoid degradation of dead zone maps. Such compensation can include balancing selected data to prevent the deletion of data that might compromise portions of a concave hull dead zone map, dividing a dead zone into two or more dead zones, or other types of compensation. Control then passes from location data analysis process 152 to compensation decision process 154.

At compensation decision process 154, if no data density issues were identified in any dead zone, control passes from compensation decision process 154 to an end process 156, which terminates process 124a within second server 20. If data density issues were identified in any dead zone and location data was adjusted to compensate for the data density issues, control passes from compensation decision process 154 to a data available process 158.

At data available process 158, a signal is transmitted to check data available process 160 at first server 18, which indicates that location data that has been compensated for data density is available for transfer from second server 20 to first server 18. Control then passes from data available process 158 to compensated data transfer process 164, described further hereinbelow.

Returning to check data available process 160, control passes from process 160 to a compensation available decision process 162. If first processor 18 received a signal from second processor 20 that compensated location data is available, control passes from compensation available decision process 162 to compensated data transfer process 164, where location data that has been adjusted is transferred from second server 20 to first server 18. Control then passes from compensated data transfer process 164 to a concave hull map creation process 166, where a concave hull map of one or more dead zones is created. It should be noted that transfer process 164 may not be an actual transfer of location data points, but can include a process for redefining a single dead zone to be a plurality of dead zones, and thus the separated dead zones can maintain boundary integrity when conditions are such that portions of a combined dead zone might otherwise be eliminated due to the relatively minimal amount of location data available.

Returning to compensation available decision process 162, if compensation for dead zones is unavailable, control passes from compensation available decision process 162 to concave hull map creation process 166, which functions as described elsewhere herein.

From concave hull map creation process 166, control passes to map transmission process 126, which functions as described elsewhere in this disclosure.

Because processes 152-158 can require a substantial time to complete, process 124a is configured to use existing location data at first server 18 rather than updated data from processes 152-158 until processing of these steps at second server 20 is complete. Once processing of revised location data in processes 152-158 is complete, then the compensation can be transferred from second server 20 to first server 18 prior to the creation of a new concave hull dead zone map, minimizing any delay in the rapid creation of contemporaneous dead zone maps at first server 18.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

I claim:

1. A system for mapping a radio frequency signal dead zone of a cellular system, the system comprising:
   at least one cellular system antenna configured to transmit and to receive radio frequency signals;
   a mobile communication device including at least one of a geographic location system receiver and a geographic location system device, a mobile communication device antenna configured to transmit and receive signals from the at least one cellular system antenna, a mobile communication device processor, and a non-transitory memory, the mobile communication device being configured to determine by way of signals received by the mobile communication device antenna that the mobile communication device has entered the radio frequency dead zone and being configured to store in the non-transitory memory location data received by the mobile communication device from the geographic location system receiver or location data determined by the geographic location system device, and when the mobile communication device is determined to leave the dead zone, the mobile communication device processor is configured to pre-process the stored location data to generate a convex hull and to transmit signals representing the convex hull to the at least one cellular system antenna; and
   a first cellular system processor communicatively connected to the at least one cellular system antenna, the first cellular system processor configured to receive the pre-processed location data transmitted by the mobile communication device and to create a concave hull map from the pre-processed data,
   wherein the created concave hull map is transmitted by way of the at least one cellular system antenna to the mobile communication device for contemporaneous presentation on a display of the mobile communication device.

2. The system of claim 1, wherein the first cellular system processor is configured to transmit the concave hull map to the mobile communication device by way of the at least one cellular system antenna.

3. The system of claim 2, wherein the mobile communication device is configured to determine whether a travel path of the mobile communication device is within a predetermined distance of or intersects the dead zone.

4. The system of claim 3, wherein the mobile communication device is configured to provide an alert if the mobile communication device determines that the travel path intersects the dead zone.

5. The system of claim 1, wherein the first cellular system processor is configured to aggregate the pre-processed location data with previously received pre-processed location data prior to creating the concave hull map.

6. The system of claim 1, including a second cellular system processor configured to identify areas of the dead zone data with low density location data.

7. The system of claim 6, wherein the concave hull is adjusted for the presence of low density location data.

8. The system of claim 1, wherein contemporaneous presentation is near real time presentation.

9. A method for mapping a radio frequency signal dead zone of a cellular system, the method comprising:
   determining that a mobile communication device has entered a dead zone;
   receiving geographic location data of the mobile communication device from a geographic location data system or determining geographic location data of the mobile communication device with a geographic location data device internal to the mobile communication device while the mobile communication device is in the dead zone;
   determining that the mobile communication device has left the dead zone;
   pre-processing the geographic location data in the mobile communication device to generate a convex hull boundary having a plurality of vertices after determining that the mobile communication device has left the dead zone;
   transmitting the plurality of vertices of the convex hull boundary to a processor of the cellular system;
   aggregating at the processor the received plurality of vertices with other received pluralities of vertices and processing the aggregated vertices to create a concave hull map of the radio frequency dead zone; and
   transmitting the created concave hull map to the mobile communication device for contemporaneous presentation on a display of the mobile communication device.

10. The method of claim 9, including transmitting the concave hull map to the mobile communication device by way of the at least one cellular system antenna.

11. The method of claim 10, including determining whether a travel path of the mobile communication device is within a predetermined distance of or intersects the dead zone.

12. The method of claim 11, including providing an alert if the mobile communication device determines that the travel path is within a predetermined distance of or intersects the dead zone.

13. The method of claim 9, including identifying areas of the dead zone data with low density location data.

14. The system of claim 13, wherein the concave hull is adjusted for the presence of low density location data.

15. The system of claim 9, wherein contemporaneous presentation is near real time presentation.

16. A system for mapping a dead zone of a cellular system for presentation on a mobile communication device, the system comprising:
   at least one cellular system antenna configured to transmit and to receive radio frequency signals;
   the mobile communication device including at least one of a geographic location device configured to determine location data and a geographic location system receiver configured to receive location data, a mobile communication device antenna configured to transmit signals to and receive signals from the at least one cellular system antenna, a mobile communication device processor, and a non-transitory memory, the mobile communication device being configured to determine from the received signals that the mobile communication device has enter entered the dead zone, and being configured to store in the non-transitory memory location data received by the mobile communication device, and when the mobile communication device is determined to leave the dead zone, the mobile communication device processor is configured to pre-process the stored location data to generate a convex hull and to transmit vertices of the convex hull to the at least one cellular system antenna; and a cellular system processor configured to receive the vertices from the at least one cellular system antenna and to create a concave hull map using the vertices, wherein the created concave hull map is transmitted to at least one user.

17. The system of claim 16, wherein the mobile communication device stores location data points immediately outside the dead zone, and determines from a closest pair process the location of a boundary of the dead zone.

18. The system of claim 16, wherein a map of the dead zone nearest to the mobile communication device is automatically downloaded to the mobile communication device.

19. The system of claim 16, wherein map metadata for the area within a dead zone is automatically downloaded to the mobile communication device when proximity to the dead zone is detected.

* * * * *